Oct. 31, 1967 L. J. STREET 3,350,545
APPARATUS FOR SENSING INFORMATION ON DOCUMENTS
Filed Feb. 1, 1963
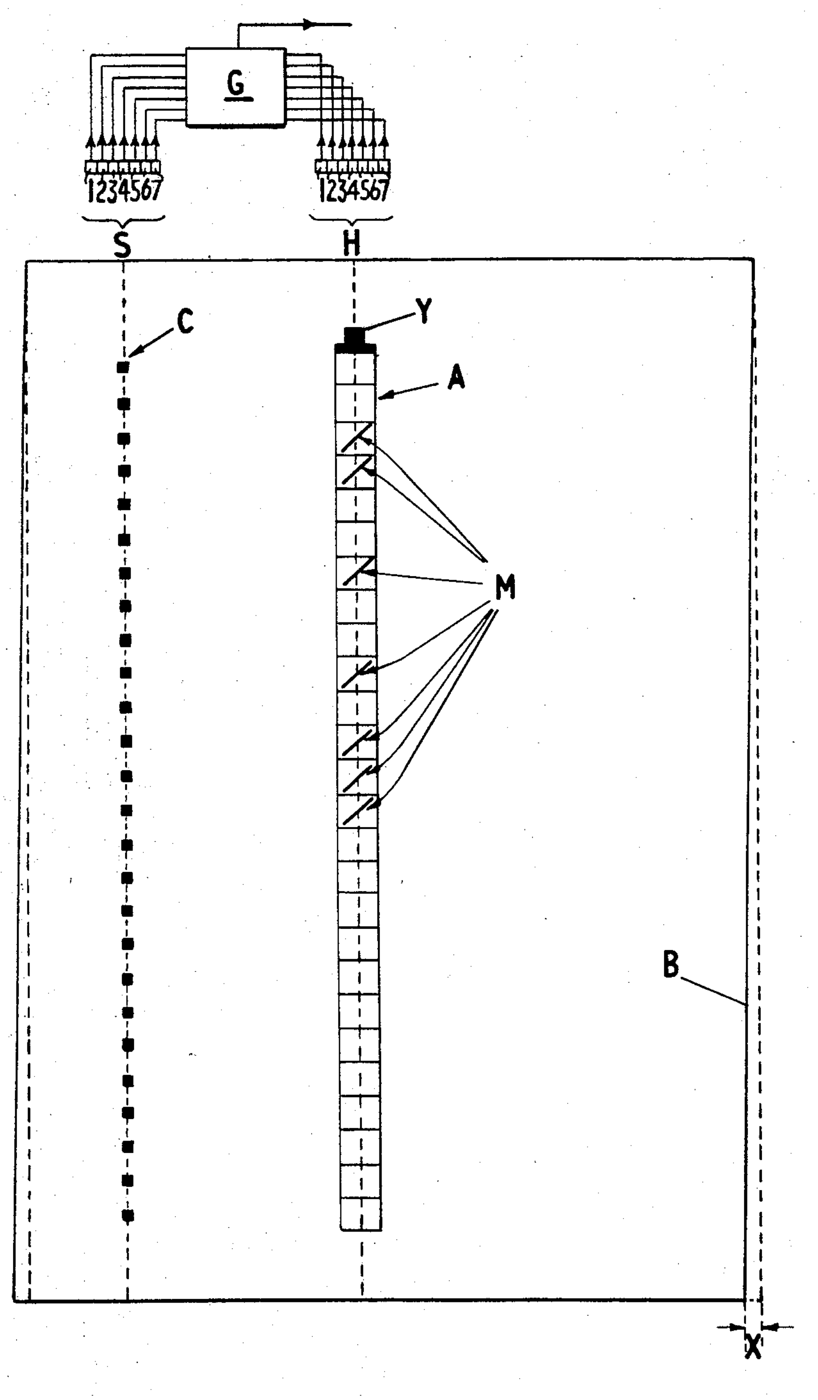
INVENTOR
LESLIE JOHN STREET
By: Norris & Bateman
Attys 3,350,545

APPARATUS FOR SENSING INFORMATION ON DOCUMENTS

Leslie John Street, Long Ashton, near Bristol, England, assignor to Parnall & Sons Limited, Birmingham, England, a British company Filed Feb. 1, 1963, Ser. No. 255,558
Claims priority, application Great Britain, Feb. 5, 1962, 4,427/62
9 Claims. (Cl. 235—61.11)

This invention relates to a method and apparatus for sensing information on documents in reading and/or sorting machines.

Many methods of mark sensing of documents in reading and/or sorting machines rely on first aligning a reference edge of each of the documents as they are traversed in sequence through the machine, and then reading an information containing column or columns on each of the documents by means of a fixed reading head scanning an area extending parallel to and spaced a predetermined distance from said reference edge. In many types of documents the information to be read consists of marks made in selected boxes within a grid comprising one or more columns of boxes printed on a sheet, so that the accuracy of printing of this grid and the subsequent guillotining of the sheet, determine the accuracy of the parallel alignment of the grid and the reference edge of the sheet. Using conventional methods whilst the printing of the grid can be carried out to a high degree of accuracy with reference to other printing on the same sheet, such as for example synchronisation marks, the guillotining of the sheets to comparable accuracy to form the reference edge in parallel relationship to the column or columns is a relatively expensive operation.

The object of the invention is to provide a method and apparatus capable of reliable reading of marks which are located within a pre-printed area of a document without imposing uneconomic requirements as to accuracy of registration between said area and a reference edge.

The drawing diagrammatically illustrates the method and apparatus of the invention.

The invention consists of a method of sensing information on a document comprising moving said document, scanning a predefined area of the document extending approximately parallel to the direction of movement of the document, by means of a first group of read heads extending across a greater width than that occupied by said area, scanning a reference mark printed on the document in accurate parallel relation to said predefined area by means of a second group of read heads extending over a greater width than that occupied by said reference mark, and rendering operative a read head of the first group selected in accordance with a read head of the second group which registers with said reference mark.

The invention further consists of apparatus for sensing information in a predefined area of a document, comprising transport means for moving the document in a direction approximately parallel to the longitudinal extent of said area of the document, a first group of fixed read heads extending across a greater width than that occupied by said predefined area, a second group of fixed read heads extending over a greater width than that occupied by a reference mark printed on the document in accurate parallel relation to said predefined area, and means connecting said first and second groups of read heads so that a read head of the first group is rendered operative as selected by the read head of the second group which is in register with said reference mark.

The invention may further reside in a document having printed areas and marks adapted for reading by the aforesaid method and apparatus according to the invention.

One example of the practical application of the invention is described with reference to the accompanying drawing as applied to the reading of marks entered in selected rectangular boxes in each of a number of printed column-like areas of a sheet such as for example a football pool coupon, only one such column being shown for the sake of simplicity.

To read a given column, such as that designated A, each containing a number of marks M to be read, a number of individual photo-heads H1–H7 are mounted in the reading machine at right angles to the direction of travel of the column A, and the number of read heads (seven in the present example) is sufficient to scan the width of the column plus an extension on each side of the column at least equal to the maximum tolerance X in the parallel registration between the column A and the document reference edge B.

A reference line C is also pre-printed on the sheet with the width of the line C less than the mark containing width of the column A (in the case illustrated it is slightly less than one third) and accurately printed to extend parallel to the length of the column A and any other columns. A further set of photo-heads S1–S7 is mounted in the reading machine at the appropriate spacing from the heads H to scan the reference line C, and these heads S are equal in number and have similar spacing to those of the column mark reading heads H.

Each of the individual column reading heads H1–H7 are connected to respective individual reference line reading heads S1–S7 through "AND" gates G in such manner that as the sheet is transported through the reading machine, one or more of the reference read heads, e.g., S3 and S4 are activated by the reference line C and in turn render their respective mark reading heads H3 and H4 "live" to sense any mark entries M present. It will be appreciated that as each sheet proceeds past the read heads H if, due to lack of parallelism between the reference edge B and the column A, the position of the marks M progressively shifts transversely with respect to the read heads H, then a similar shift will be experienced by the reference line C so that the accompanying change in the individual activated read heads S1–S7 will produce similar change in the respective live read heads H1–H7 to preserve the reading throughout the length of the column A.

In applications where synchronisation marks form a fundamental part of the reading system, as in the case of football pool coupons, this function can be amalgamated with the registration function of the reference line C by interrupting the line C as illustrated to provide a plurality of line bits respectively aligned one bit with the centre of each of the boxes of the column A. By this means the live reading heads S1–S7 and therefore the mark reading heads H1–H7 are only active when the latter register with the centres of the lengths of the individual boxes so that the transverse grid lines are not misread as marks.

It will be seen that a single reference line C, together with its associated reading heads, can serve to control each of a number of sets of mark sensing heads H identified one set with each of a number of parallel columns so that the several columns on the same document can be read simultaneously.

In some applications it is found that although a wide tolerance X has to be accommodated in the machine the actual error in a given bath of documents may be small. In sheets having small errors a "lead in" block Y of lesser width than the following mark entry column A can be used to pre-select a reduced number of the read heads H (say four out of seven) for subsequent reading of the column. This system enables the distance between adjacent columns to be reduced with consequent better utilisation of the available space on the sheet.

I claim:

1. The method of sensing information on a document comprising moving said document, scanning a predefined area of the document extending approximately parallel to the direction of movement of the document by means of a first group of individual read heads extending laterally of the direction of movement of said document across a greater width than that occupied by said area, scanning a reference mark printed on the document in laterally spaced accurate parallel relation to said predefined area by means of a second group of individual read heads extending laterally of said direction of movement of said document over a greater width than that occupied by said reference mark, and rendering operative a read head of the first group selected in accordance with an associated read head of the second group which registers with said reference mark.

2. Apparatus for sensing information in a predefined area of a document, comprising transport means for moving the document in a direction approximately parallel to the longitudinal extent of said area of the document, a first group of individual fixed read heads extending laterally of the direction of movement of said document across a greater width than that occupied by said predefined area, a second group of individual fixed read heads extending laterally of the direction of movement of said document over a greater width than that occupied by a reference mark printed on the document in laterally spaced accurate parallel relation to said predefined area, and means connecting said first and second groups of read heads so that as associated read head of the first group is rendered operative as selected by the read head of the second group which is in register with said reference mark.

3. Apparatus according to claim 2, comprising a plurality of first groups of fixed read heads, each group positioned to scan a respective area of a plurality of predefined parallel areas on the document, each of said second group of read heads being connected to control simultaneously a respective read head in each of said first groups.

4. The method defined in claim 1, wherein the predefined document area comprises at least one printed column defined to accommodate entry marks, said column extending approximately parallel to one straight edge of the document, and said reference mark is printed in accurately parallel relation to said column and of lesser width than said column.

5. The method defined in claim 4 wherein said reference mark consists of a broken line having line bits longitudinally spaced in predetermined constant relationship to the longitudinal spacing of respective mark entry boxes in said column.

6. The method defined in claim 1, wherein said column is preceded by a printed mark of lesser width than that of the column for pre-selection of a reduced number of the first read heads.

7. The apparatus defined in claim 2, wherein each group of read heads comprises a row of individual read heads extending at right angles to said direction of movement of the document.

8. The apparatus defined in claim 2, wherein said width of extension of the first group of read heads is equal to the lateral width of said predefined area plus a predetermined tolerance in parallel registration between the length of said area and an associated edge of said document.

9. The apparatus defined in claim 2 wherein there are the same number of spaced read heads in each group.

References Cited

UNITED STATES PATENTS

| | | | |
|---|---|---|---|
| 2,575,034 | 11/1951 | Tyler et al. | 235—61.11 |
| 3,052,408 | 9/1962 | Cunningham et al. | 235—61.11 |

DARYL W. COOK, *Acting Primary Examiner.*

MAYNARD R. WILBUR, *Examiner.*

R. COUNCIL, *Assistant Examiner.*